United States Patent [19]

Filleau et al.

[11] 3,897,705

[45] Aug. 5, 1975

[54] DEVICE FOR SLITTING SHEET MATERIAL

[75] Inventors: Paul Filleau, Villers-sur-Marne; Claude Coyon, Montbard, both of France

[73] Assignee: Le Metal Deploye, Clamart, France

[22] Filed: Aug. 5, 1974

[21] Appl. No.: 495,082

[30] Foreign Application Priority Data

Aug. 9, 1973 France .................. 73.29187

[52] U.S. Cl. .................. 83/341; 29/6.1; 83/344; 83/345; 83/664; 83/698
[51] Int. Cl. .................. B23d 25/12; B26d 1/40
[58] Field of Search ............ 83/341, 344, 345, 664, 83/698; 29/6.1, 163.5 R; 72/332, 185, 186, 204, 203

[56] References Cited
UNITED STATES PATENTS

| | | | |
|---|---|---|---|
| 3,000,250 | 9/1961 | Altmann et al. ............... | 83/345 X |
| 3,283,633 | 11/1966 | Finke et al. .................... | 83/344 X |
| 3,606,811 | 9/1971 | Hallden .......................... | 83/344 X |

*Primary Examiner*—Frank T. Yost
*Attorney, Agent, or Firm*—Brisebois & Kruger

[57] ABSTRACT

Device for slitting sheet material comprises two parallel shafts adapted to receive said sheet material therebetween. Each shaft carries a plurality of discs carrying a plurality of transverse cutters equally spaced about the periphery of the disc and lying at an angle to its axis of rotation. The cutters on the discs of one shaft cooperate with those on the other shaft to slit the sheet material. Means are provided for moving one of the shafts toward and away from the other. The shafts are driven through an Oldham coupling to accommodate such movement.

12 Claims, 7 Drawing Figures

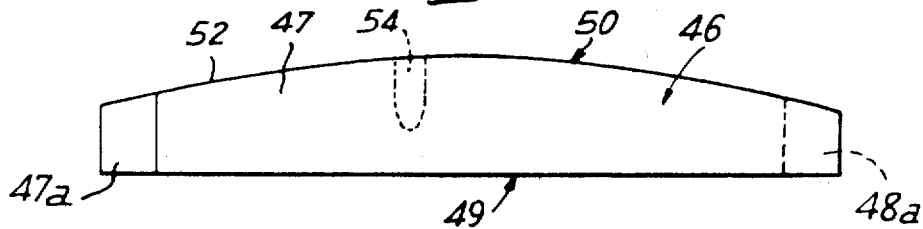
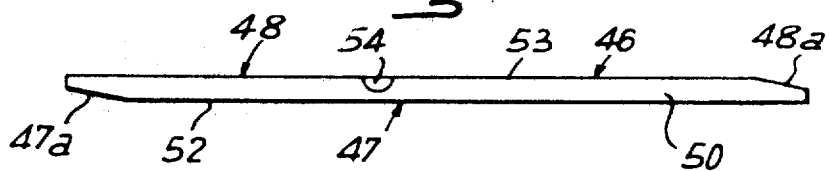
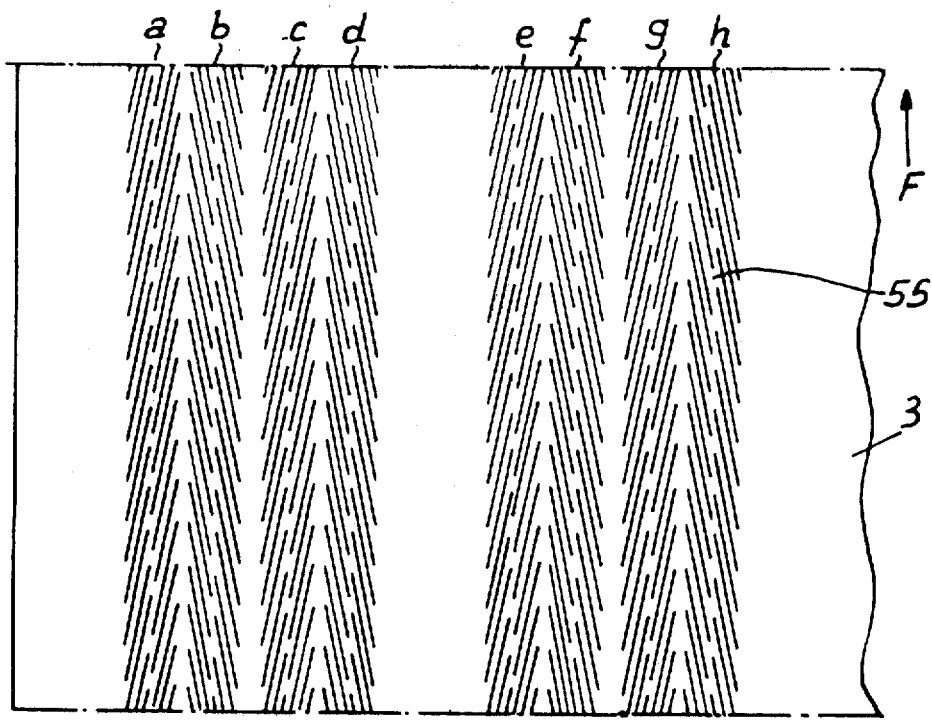

DEVICE FOR SLITTING SHEET MATERIAL

SUMMARY OF THE INVENTION

This invention relates to a device for manufacturing slit metal sheets and especially expanded metal sheets of the type having a series of slits in a chevron pattern. The invention also relates to a method of utilizing this apparatus and to slit or expanded metal sheets produced in this manner, which may be used, for example as lathing to be attached to a wall and covered with plaster or the like.

There is a known process of manufacturing such slit sheets adapted to be expanded, which method consists in passing a sheet step-by-step between jaws provided with cutting members which periodically approach each other at moments when the sheet is stationary. These known processes make it possible to obtain entirely satisfactory expanded metal sheets.

However, these sheets can be manufactured only at a relatively low speed, because of the limited number of strokes per minute of the reciprocating mechanical presses.

For this reason, it has already been suggested that a strip of sheet metal be led between two rotating tools having arcuate cutting members which are inclined with respect to a plane transverse to the corresponding tool, with these cutters interengaging so as to permit continuous operation. Devices operating in this manner have never, however, been put into successful use on a commercial scale, because they have lacked means for positioning the cutting edges as precisely as necessary to cut the slits in conventional metal sheets, which are relatively thick. Moreover, in the construction of these tools, the cutters of which extend over substantial angular distances, and the assembly of which requires mechanical spacing and bolting means, it is necessary to allow so large a tolerance in order for the engagement to take place that this tolerance is incompatible with the required precision.

The present invention proposes to overcome these disadvantages and to provide a device for making slit sheets suitable for expansion, while permitting a substantial increase in the speed at which said sheets are manufactured, and this in a completely continuous, automatic process which is less noisy than mechanical presses.

It is accordingly the object of the present invention to provide an apparatus for manufacturing slit sheets suitable for expansion comprising means for advancing a strip of sheet material in a continuous manner, and at least one pair of rotating tools positioned on opposite sides of the strip and carrying cutters capable of jointly slitting the strip, said cutters being adapted to interengage with each other. The apparatus is characterized by the fact that each tool comprises a circular metallic disc having in its edge a series of regularly spaced notches which are inclined with respect to the axis of rotation of the tool, each notch receiving a bar of very hard material such as a special carbide or tungsten cutting steel cemented or magnetically retained in the notch. Each bar has two parallel cutting edges formed by two lateral, substantially plane surfaces, and a convex cylindrical upper surface having as its cylindrical axis the axis of rotation of the tool. The angle between each cutting edge of each tool and the axis of rotation of the tool is at least 45°, and preferably substantially more, so as to lie between 70° and 80°, the spacing between the notches being such that one bar of one of the tools engages between two corresponding bars on the other tool with a very small play therebetween.

In this way great accuracy in the mounting of the bars is obtained, whereas conventional mounting means do not provide sufficient accuracy, either in themselves, or because of the thermal deformations which they engender.

In an advantageous manner, the rearmost curved edge of each member has a gap defined by a notch preferably formed in the lateral surface corresponding to this edge, which notch has a depth with respect to said lateral face such that, after cutting of the sheet two pieces of metal, positioned on opposite sides of a slit, are connected by a small bridge or web of material lying in the center of the notch.

The device according to the invention preferably comprises two parallel shafts, each provided with several tools cooperating with several pairs of corresponding tools. In a particularly advantageous embodiment the bars of one tool are oriented in a direction opposite to that of the bars of an adjacent tool carried by the same shaft to provide slits in a chevron arrangement.

In one particular embodiment, the device according to the invention has, mounted on a frame, upstream of the means for advancing the strip of sheet metal, two parallel shafts, which are preferably horizontal and positioned one beneath the other. These two shafts carry a plurality of tools to form a plurality of pairs of corresponding tools capable of interengaging with each other, means being provided to separate said shafts and bring them toward each other, as well as means for rotating said shafts so as to ensure their rotation in synchronism.

Preferably each of these shafts is driven by rotary driving means, the shaft which is movable with respect to the other being driven through suitable kinematic drive means such as an Oldham coupling.

In a particular embodiment, one of the shafts, the lower shaft for example, is mounted on one or more gliders, capable of sliding vertically to approach the other shaft, said glider or gliders being adapted to be actuated by controlled actuating means, such as worm screw means, for example, in which said worm screw itself is driven by worm screw and gear wheel assembly controlled by a suitable motor.

The frame may also carry means for smoothing the slitted sheet, comprising one or more pairs of rollers or cylinders.

It is a further object of the invention to provide a method of using said apparatus to manufacture slit and expanded sheets, said process being characterized by the fact that a strip of sheet metal is continuously advanced between at least one, and preferably several pairs of tools according to the invention, the cutters of which exert a conjoint slitting action and move, while in contact with the sheet, at a speed of progress substantially equal to that of the strip.

It is yet a further object of the invention to provide slit sheets, and especially expanded metal sheets produced in accordance with the process according to the invention.

Other advantages and characteristics of the invention will become apparent from a reading of the following description of a preferred embodiment of the invention, given purely by way of illustration and example, with reference to the accompanying drawings, in which:

FIG. 5 is a side view on an enlarged scale, showing one cutter;

FIG. 6 is a view showing the same cutter as seen from the bottom of FIG. 5; and

FIG. 7 is a top plan view showing a sheet which has been slit in accordance with this invention, before it has been expanded.

The general construction of the device according to the invention will now be described with reference to FIGS. 1 and 2.

Figure 1:
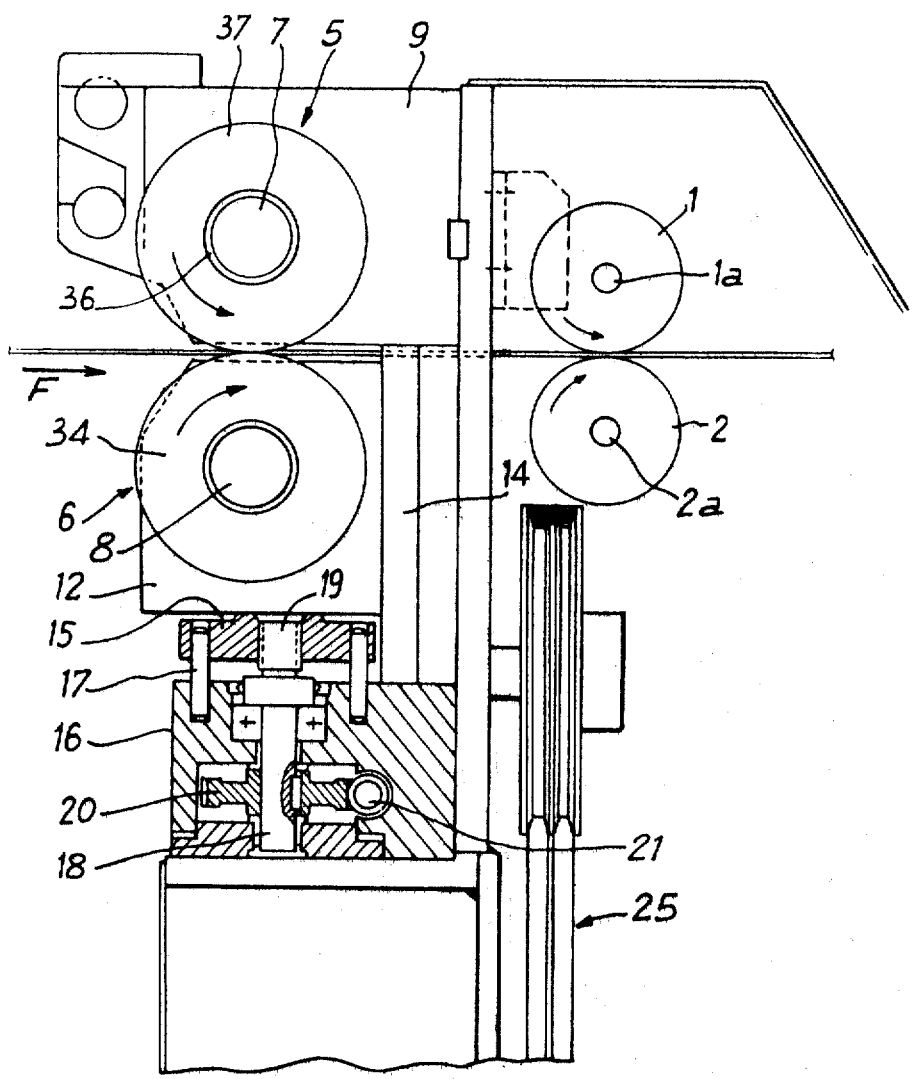
FIG. 1 is a schematic vertical sectional view taken through one embodiment of the machine.

FIG. 1 is a partial vertical sectional view showing a device for the manufacture of expanded metal sheets. This device comprises two smoothing cylinders 1 and 2 which rotate in opposite directions and are positioned on opposite sides of the strip 3, which travels in the direction indicated by the arrow F. These cylinders are driven by coaxial shafts 1a, 2a, which are themselves driven by a motor 4 as will be hereinafter described.

The strip 3, before reaching the cylinders 1 and 2, passes between two sets of tools indicated generally by reference numerals 5 and 6 and respectively supported by two horizontal shafts 7 and 8, positioned one beneath the other. The upper shaft 7 is journalled at its two ends in bearings mounted on the frame 9 of the machine.

The shaft 8, on the other hand, is journalled at one end in a bearing 10 and at a certain distance from its other end, in a movable bearing 12. The bearings 10 and 12 respectively are themselves carried by two channel members 11 and 13 mounted to slide on the two vertical guides 14. During their vertical movement the channel members 11 and 13 are fastened to nuts such as 15 respectively positioned at the bottoms of the channel members and having the axes of their threaded orifices in a vertical position. Each nut is held against rotation with respect to a block 16 fixed to the frame 9 by means of vertical pins 17 which are mounted to slide in suitable vertical orifices in the nut 15 during the vertical movement of the nut.

A vertical shaft 18 is journalled in each block 16 and carries at its upper end threads 19 cooperating with the threads in the nut 15. A gear 20 driven by a worm screw 21 is mounted on each shaft 18. The same screw drives both gears 20 and a control wheel 22 is mounted on one end thereof.

Consequently, in order to change the vertical position of the set of tools 6 mounted on the shaft 8, the control wheel 22 is rotated to turn the shafts 18 and, consequently, the threaded end 19, which turns in the threads of the nut 15, rotation of which is prevented by the pins 17, causes this nut to move vertically, to raise or lower, in dependence on the direction of rotation of the control wheel 22, the corresponding channel member, which slides on the guides 14. In this manner the two channel members are caused to slide in synchronism.

In order to permit it to be driven in rotation by the variable speed motor 4, the end of the shaft 8 which projects beyond the bearing 12 is connected to a first output shaft 23 of speed reduction gearing 24 driven by the variable speed motor 4 through a belt and pulley transmission 25. The shaft 23 is connected to the shaft 8 by a double Oldham coupling 26 which makes it possible to ensure perfect kinetic continuity between the rotation of the shaft 23 and the rotation of the shaft 8 driven by the shaft 23 regardless of the height of the channel members 11 and 13 supporting the shaft 8.

As may be seen, the shaft 23 carries a sprocket wheel 27 which drives (by means of a chain, not shown) a sprocket wheel 28 mounted on the shaft 2a. A gear wheel 29, mounted on the same shaft 2a near the driving cylinder 2 is adapted to cooperate with an identical gear (not shown) carried by the upper shaft 1a to drive the cylinder 1 in the opposite direction from that in which cylinder 1 is driven.

In order to drive the shaft 7 in a direction opposite to that in which the shaft 8 is driven, a pair of pinions is provided which are axially spaced at a constant distance and drive in rotation the shaft 23 and a like shaft 23a coaxial with the shaft 7 and constrained to rotate therewith by a double Oldham coupling. The shaft 23a driving the shaft 7 has a clutch permitting the Oldham coupling to be connected from the shaft 7 and consequently kinematically release the shaft 8 for angular adjustment of the shaft 7 with respect to the shaft 8.

Figure 2:
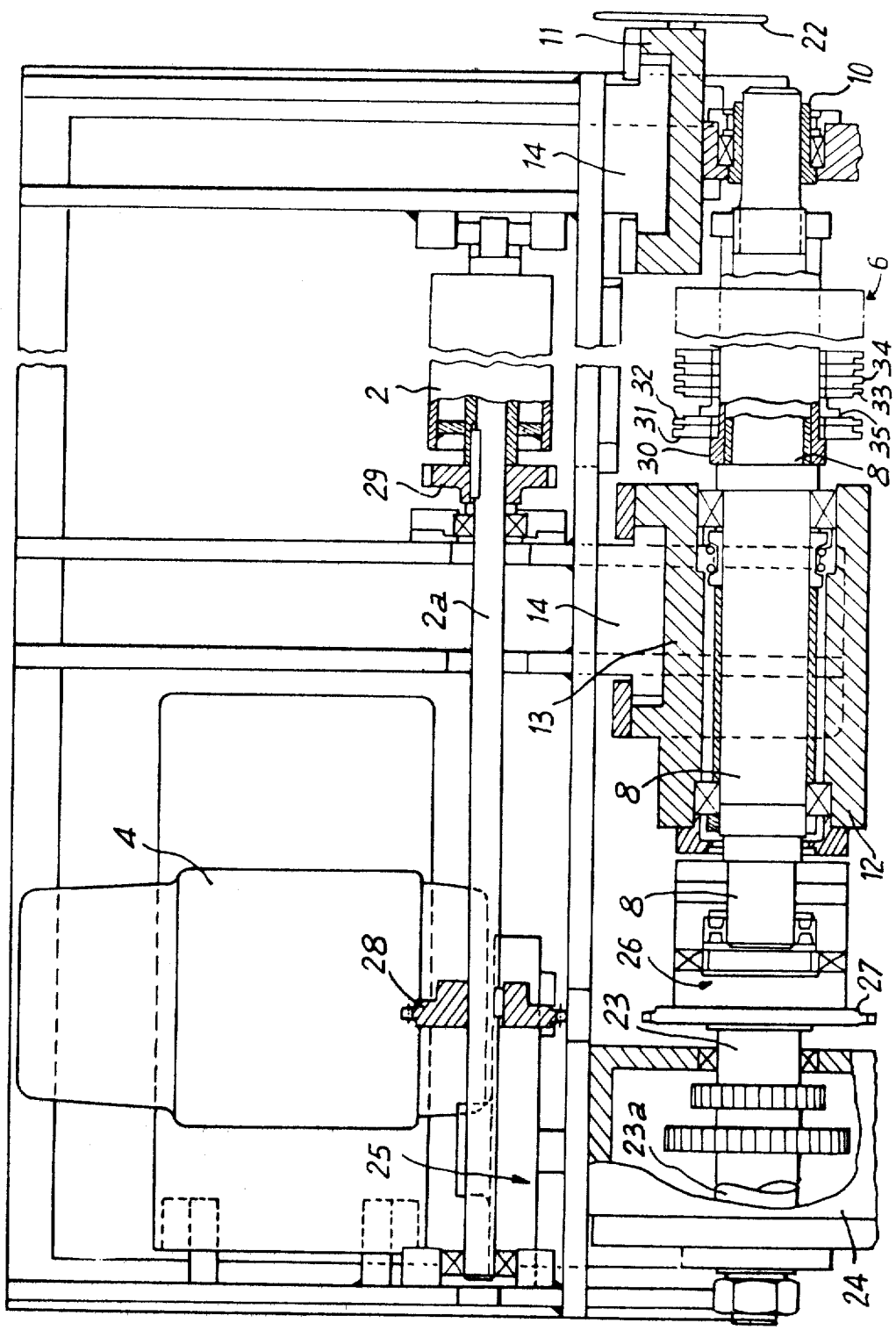
FIG. 2 is a schematic view of the machine shown in FIG. 1, taken in the plane in which the strip of sheet metal advances, and looking downward.

As will be seen on FIGS. 1 and 2, a cylindrical sleeve 30 is located on the shaft 8 at the desired angular position relative thereto by any suitable means, such as a key. A plurality of circular tools 31, 32, 33, 34, etc. are in their turn angularly spaced on the sleeve 30. Spacer rings such as 25 may be positioned between certain of the tools to separate them axially. Moreover, it will be seen that the width of the peripheral cutting edges of the tools 31, etc. is less than the thickness of the more central parts of the discs constituting said tools, so as to leave spaces between the slits in the sheet as will be hereinafter seen.

Of course, the upper shaft 7 carries a sleeve 36 identical to the sleeve 30 and supporting an equal number of tools corresponding respectively to the tools 31, 32, 33, 34, etc. of the shaft 8 in order to form a pair of circular tools positioned one above the other and rotating in opposite directions on opposite sides of the strip of sheet metal 3 as it is continuously advanced.

FIG. 1 shows a tool 37 corresponding to a lower tool 34. Referring now to FIGS. 3–6, the tool 34 illustrated therein comprises a metallic disc 38 provided with a central orifice 39 having a suitable notch 40 for receiving a key which locates the disc 38 angularly with respect to the sleeve 30. On one of its surfaces the disc has a thickened portion 41 acting as an axial spacer with respect to the adjacent disc 33.

Figure 4:
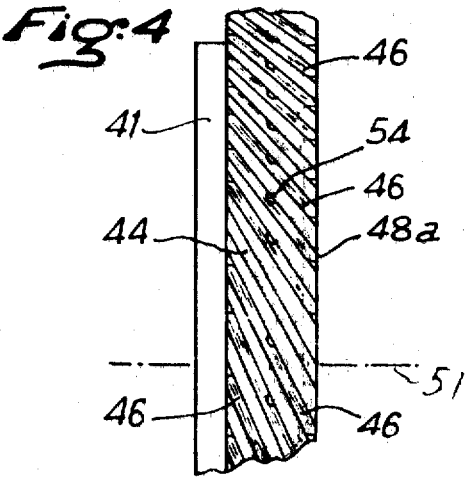
FIG. 4 is a partial edge view showing the periphery of the tool carrying the bars.

Inclined notches or grooves 44 are formed in the periphery 43 of the disc and such a groove may be seen at 44 in FIG. 4.

In the different grooves 44 are inserted cutting members champfer of bars 46 made of a very hard material such as a special tungsten or carbide steel, the shape of which is illustrated in greater detail on FIGS. 5 and 6. These figures show that each bar 46 has two lateral surfaces, a front surface 47 and a rear surface 48, extending parallel to each other and to the median plane of the bar. These two surfaces 47 and 48 are perpendicular to the radially inner surface 49 of the bar. Each surface is slightly champfered at one end as indicated at 47a, 48a, the chamfer having an angle such that the surfaces 47a, 48a, are parallel to the two lateral surfaces of the disc 38 when the bar is put in place, as may be seen on FIG. 4.

Figure 3:
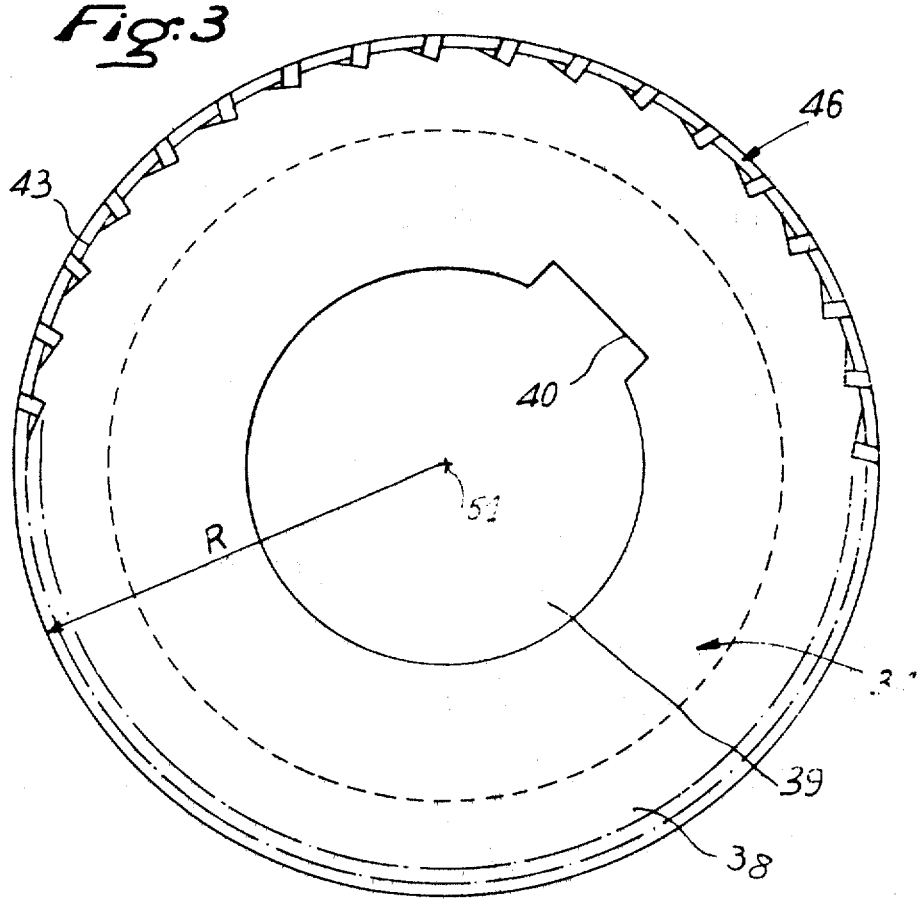
FIG. 3 is a plan view of the tool.

The radially outer surface 50 of the bar is convex and extends along the surface of a cylinder corresponding to the external periphery of the tool, that is to say, to the larger radius R of the tool, which is shown on FIG. 3.

In practice, because of the normally substantial inclination of the bars 46 with respect to the geometrical axis 51 of the tool 34, which inclination is, in the selected example 79°, it is possible to shape the upper surface 50 of the bar 46 to follow a cylindrical locus of the radius R equal to the maximum radius of the tool and perpendicular to the surfaces 47 and 48. Since the bars are mounted by adjusting them on the periphery of the tool 34, the surfaces 50 tend to lie in the locus of a cylinder of revolution having a radius equal to R minus any wear and coaxial with the shaft 51 of the tool.

The bar 46 thus has at the intersection of its surfaces 47 and 50 a sharp front edge 52 and, at the intersection of the surfaces 48 and 50 a sharp rear edge 53. The rear edge 53 is interrupted by a vertical notch 54 formed in the upper part of the rear surface 48, the exact position of which will be hereinafter specified. The different bars 46 are held inside the grooves 44, which are slightly wider than the bars, by any suitable adhesive means. It is also possible to hold them in place magnetically or in any other manner not requiring heating of the disc.

It follows that the space between two consecutive bars 46 positioned on the periphery of the tool 34 is slightly greater than the thickness of a bar so as to permit the engagement of the bars of the two complementary tools 34 and 37 like a punch and die. It also follows that the bars are positioned on the tool 37 which cooperates with the tool 34 so that each front edge 52 of a bar of the tool 37 comes during its rotation into a position immediately adjacent a rear edge 53 of the tool 34 and vice versa.

In this manner, when a front edge of one of the tools of a pair of tools cooperates with the corresponding rear edge of the other tool, the slot thus formed by shearing the sheet 3 is interrupted at its middle because of the notch 54, the arrangement of the notch 54 on the rear edge 53 of a bar being such that it prevents shearing by the central part of the front edge 52 of the bar of the other tool which cooperates with it.

In order to carry out the process according to the invention a strip of sheet metal, for instance, a strip of galvanized steel, is passed between the shafts 7 and 8 carrying their respective sets of tools, after having first taken care to lower the shaft 8 by lowering the channel members 11 and 13. The channel members are then raised and in the course of this movement the bars of the rotating upper tools cut through the sheet to engage between the bars of the lower rotating tools. By advancing the sheet at a uniform rate of speed in the direction of the arrow F, a succession of inclined slits is formed in the sheet, which slits are inclined with respect to the direction of advance and lie in a straight line.

FIG. 7 shows one part of a sheet which has been subjected to an advance in the direction of the arrow F between an upper and a lower set of tools, each set comprising eight tools so that the device comprises sixteen circular tools in all. It will be seen that the tools of one set, just like the tools of the other set, are alternately directed so as to form slots in a chevron arrangement. This produces on the sheet 3, eight series of slots A to H and it will be seen that for each series of slots each of the slots is interrupted at its center by a small intact zone of metal 55 resulting from the presence of a notch 54. The distances between two adjacent series of slits such as A and B, for example, is determined by the thickness of the spacers positioned between two adjacent tools of the same set. These spacers may consist, for example, of the thickened portions 41 of the two tools.

The sheet 3, which has been provided with longitudinal ribs by conventional deforming tools, is then drawn by traction on these ribs in a direction perpendicular to the arrow F so as to open the slits and form a sheet of expanded metal of the type envisaged. It is also possible, before expansion, to bend a part of the sheet out of its original plane about a longitudinal line, travelling in the direction of the arrow F for example, to form angle members.

Of course, in certain applications it is possible to eliminate the notches 54 and thus form continuous slots having no central interruption.

While one particular embodiment of the invention has been described, it will be appreciated that the scope of the invention is not limited to this specific embodiment, which may be modified as to detail without thereby departing from the basic principles of the invention as defined by the following claims.

What is claimed is:

1. In a device for manufacturing slitted sheets suitable for subsequent expansion, said apparatus comprising means for continuously advancing a strip of sheet metal and at least two rotating tools, one positioned on each side of the strip and each carrying cutting members positioned to cooperate to pierce the strip with the cutting members of one tool engaging between those of the other tool, the improvement according to which each tool comprises a circular metallic disc having along its edge a series of notches which are regularly spaced from each other and inclined with respect to the axis of rotation of the tool, a bar of hard material in each notch, each bar having two cutting edges extending parallel to each other and two parallel lateral surfaces and a curved radially outer surface lying in a cylindrical locus coaxial with the axis of rotation of the tool, the angle between each cutting edge and the axis of rotation of the tool on which it is mounted being at least 45°, and the spacing between the notches being such that each bar of one of the tools is received in succession between two corresponding bars on the other tool as the tools rotate.

2. Device as claimed in claim 1 in which each cutting edge lies at an angle of 70°–80° to the axis of rotation of the tool on which it is mounted.

3. Device as claimed in claim 1 in which each of the cutting edges is centrally interrupted by a notch in the bar.

4. Device as claimed in claim 3 in which each of said notches is carried on the rear edge of a bar and has a depth beneath said edge such that a part of the material being cut near the middle of the slit in the sheet remains intact.

5. Device as claimed in claim 1 which comprises two parallel shafts each provided with a plurality of tools forming several pairs of cooperating tools.

6. Device as claimed in claim 1 comprising a frame having in the front thereof means for advancing the sheet said frame supporting two parallel shafts each carrying a plurality of tools to form a plurality of pairs of cooperating tools capable of engaging each other, means for separating and bringing together the two shafts, and means for synchronously rotating said shafts.

7. Device as claimed in claim 6 in which one of the shafts is mounted on at least one slider capable of sliding said one shaft toward the other shaft, and means for sliding said sliders.

8. Device as claimed in claim 7 in which the shafts mounted on the sliders are rotatably driven by a motor through an Oldham coupling.

9. Device as claimed in claim 6 in which each shaft carries a sleeve mounted thereon, said sleeve supporting a plurality of circular tools separated from each other by axial spacers and said tools lying at different angles with respect to the axis of said sleeve.

10. Device as claimed in claim 1 in which at least some of the tools have thickened portions serving to axially space their edges from the edges of adjacent tools.

11. Device as claimed in claim 1 in which each said bar is adhesively secured in its notch.

12. Device as claimed in claim 1 in which each said bar is magnetically retained in its notch.

* * * * *